United States Patent Office 3,306,898
Patented Feb. 28, 1967

3,306,898
ALPHA (PHOSPHORYL, PHOSPHORYTHIO, THIO-PHOSPHORYL AND DITHIOPHOSPHORYL)-ALPHA (HYDROCARBON MERCAPTOMETHYL) PROPIONATE ESTERS AND AMIDES
Richard Sehring and Karl Zeile, Ingelheim (Rhine), Germany, assignors to C. H. Boehringer Sohn, Ingelheim (Rhine), Germany, a limited partnership of Germany
No Drawing. Filed July 31, 1963, Ser. No. 299,088
Claims priority, application Germany, Aug. 3, 1962, B 68,304
18 Claims. (Cl. 260—247.1)

This invention relates to novel phosphorus compounds as well as to various methods of preparing them. It also relates to acaricidal and insecticidal compositions comprising one or several of the novel compounds as active ingredients.

More particularly, the present invention relates to novel phosphorus compounds of the formula

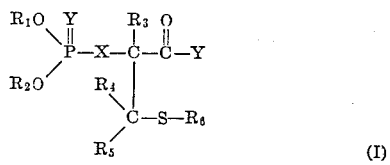

(I)

wherein $R_1$ and $R_2$ are each selected from the group consisting of straight and branched alkyl of 1 to 3 carbon atoms,
$R_3$ is selected from the group consisting of straight and branched alkyl of 1 to 3 carbon atoms,
$R_4$ and $R_5$ are each selected from the group consisting of hydrogen, straight and branched alkyl of 1 to 3 carbon atoms, phenyl, and substituted phenyl with lower alkyl, halogen and/or nitro as substituents,
$R_6$ is selected from the group consisting of straight and branched alkyl of 1 to 3 carbon atoms, aryl and substituted aryl with lower alkyl, halogen and/or nitro as substituents,
X is selected from the group consisting of oxygen and sulfur, and
Y is selected from the group consisting of —OR$_7$, where $R_7$ is alkyl of 1 to 6 carbon atoms or alkyl of 1 to 6 carbon atoms interrupted by oxygen or sulfur, and

where $R_8$ and $R_9$ are each selected from the group consisting of hydrogen, straight and branched alkyl of 1 to 3 carbon atoms and, together with each other and the adjacent nitrogen, a heterocyclic ring which may contain additional heteroatoms.

The compounds of the present invention, that is, those embraced by Formula I above, may be prepared by a number of different methods, among which the following have been found to be most convenient and efficient:

METHOD A

Reaction of a salt, preferably a sodium, potassium or amine salt, of an O,O-dialkyl-dithiophosphoric acid of the formula

(II)

or of an O,O-dialkyl-thiophosphoric acid of the formula

(III)

wherein $R_1$ and $R_2$ have the same meanings as in Formula I, with a compound of the formula

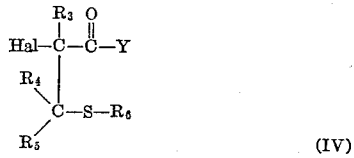

(IV)

wherein $R_3$, $R_4$, $R_5$, $R_6$ and Y have the same meanings as in Formula I and Hal is a halogen, preferably chlorine. The reaction is advantageously performed at elevated temperatures, preferably between 40 and 100° C., and in the presence of an inert solvent. The performance of the reaction in ethanolic or aqueous solution is preferred; however, ketones, ethers or hydrocarbons may also be used as reaction media.

METHOD B

Reaction of an O,O-dialkyl-phosphoric acid chloride or O,O-dialkyl-thiophosphoric acid chloride of the formula

(V)

wherein $R_1$, $R_2$ and X have the same meanings as in Formula I, with a compound of the formula

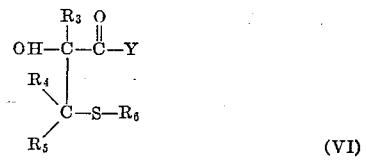

(VI)

wherein $R_3$, $R_4$, $R_5$, $R_6$ and Y have the same meanings as in Formula I. The reaction is advantageously performed in pyridine or a hydrocarbon, such as benzene or toluene, as an inert solvent medium and in the presence of a compound capable of tying up or neutralizing acids, such as triethylamine.

The compounds of the present invention are colorless to yellow oils.

The following examples illustrate the invention and will enable others skilled in the art to understand it more completely. It should be understood, however, that the invention is not limited to these particular examples.

Example 1

For the preparation of O,O-diethyl-S-($\alpha$-methyl-$\beta$-mercapto - ethyl) - $\alpha$-propionic acid ethyl ester-dithiophosphate of the formula

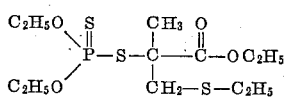

120 gm. of sodium O,O-diethyl-dithiophosphate were dissolved in 200 cc. of methyl isobutyl ketone. 105 gm. of $\alpha$-chloro-$\alpha$-methyl-$\beta$-mercaptoethyl-propionic acid ethyl ester were added dropwise while maintaining at 40–50° C. After all of the ester had been added the reaction mixture was heated in the water bath for 5 hours and then cooled to 10° C. After 150 cc. of toluene had been added 150 cc. of water were poured into the reaction mixture while stirring. The toluene/methyl isobutyl ketone layer was separated, dried and the solvents were evaporated. The yield was 130 gm. (100% of the theory) of the desired compound.

*Analysis.*—Calculated: P, 8.6%. Found: P, 8.5%.

Example 2

Using a procedure analogous to that described in Example 1, O,O-diethyl-S-($\alpha$-methyl-$\beta$-mercaptoethyl)-$\alpha$- propionic acid methyl ester-dithiophosphate of the formula

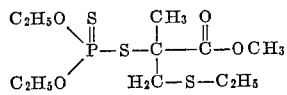

was prepared from the sodium salt of O,O-diethyl-dithiophosphoric acid and α-chloro-α-methyl-β-mercaptoethyl-propionic acid methyl ester.

*Analysis.*—Calculated: P, 8.95%. Found: P, 9.1%.

Example 3

Using a procedure analogous to that described in Example 1, O,O-diethyl-S-(α-methyl-β-mercapto-p-chlorophenyl)-α-propionic acid methyl ester-dithiophosphate of the formula

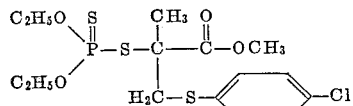

was prepared from the sodium salt of O,O-diethyl-dithiophosphoric acid and α-methyl-α-chloro-β-mercapto-p-chlorophenyl-propionic acid methyl ester.

*Analysis.*—Calculated: Cl, 8.3%. Found: Cl, 8.0%.

Example 4

Using a procedure analogous to that described in Example 1, O,O-diethyl-S-(α-methyl-β-mercapto-p-chlorophenyl)-α-propionic acid morpholide-dithiophosphate of the formula

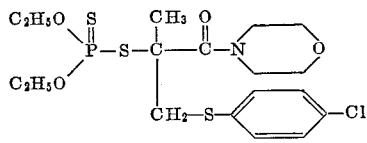

was prepared from the sodium salt of O,O-diethyl-dithiophosphoric acid and α-chloro-α-methyl-β-mercapto-p-chlorophenyl-propionic acid morpholide.

*Analysis.*—Calculated: N, 2.90%. Found: N, 2.98%.

Example 5

Using a procedure analogous to that described in Example 1, O,O-diethyl-S-(α-methyl-β-mercaptoethyl)-α-propionic acid-N-methylamide-dithiophosphate of the formula

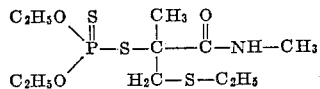

was prepared from the sodium salt of O,O-diethyl-dithiophosphoric acid and α-chloro-α-methyl-β-mercaptoethyl-propionic acid-N-methylamide.

*Analysis.*—Calculated: N, 4.06%. Found: N, 4.14%.

Example 6

Using a procedure analogous to that described in Example 1, O,O - diethyl - S-(α-methyl-β-mercaptoethyl)-α-propionic acid morpholide-dithiophosphate of the formula

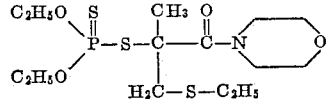

was prepared from the sodium salt of O,O-diethyl-dithiophosphoric acid and α-chloro-α-methyl-β-mercaptoethyl-propionic acid morpholide.

*Analysis.*—Calculated: N, 3.49%. Found: N, 3.30%.

Example 7

Using a procedure analogous to that described in Example 1, O,O - diethyl - S-(α-methyl-β-mercapto-p-chlorophenyl)-α-propionic acid N-methylamide-dithiophosphate of the formula

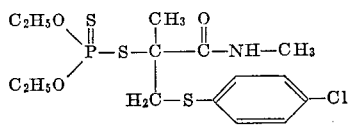

was prepared from the sodium salt of O,O-diethyl-dithiophosphoric acid and α - chloro - α-methyl-β-(mercapto-p-chlorophenyl)-propionic acid-N-methylamide.

*Analysis.*—Calculated: N, 3.28%. Found: N, 3.40%.

Example 8

Using a procedure analogous to that described in Example 1, O,O - diethyl-S-(α-methyl-β-mercapto-p-chlorophenyl)-α-propionic acid ethyl ester-thiolphosphate of the formula

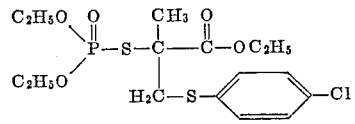

was prepared from the sodium salt of O,O-diethyl-thiolphosphoric acid and α-chloro - α - methyl-β-(mercapto-p-chlorophenyl)-propionic acid ethyl ester.

*Analysis.*—Calculated: P, 7.27%. Found: P, 7.12%.

Example 9

For the preparation of O,O-diethyl-o-(α-methyl-β-mercapto-p-chlorophenyl)-α-propionic acid ethyl ester-phosphate of the formula

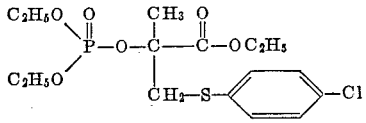

137.5 gm. of α-methyl-α-hydroxy-β-mercapto-p-chlorophenylpropionic acid ethyl ester were dissolved in 500 cc. of toluene. 50.5 gm. of triethylamine were added and the solution was heated to 60° C. and at this temperature maintained for 10 minutes. Thereafter 91 gm. of O,O-diethylphosphoric acid chloride were added dropwise. The reaction mixture was maintained at 60° C. for another 2 hours, then cooled and the precipitate formed thereby was separated by vacuum filtration. The filtrate was shaken with 50 cc. of water, the water layer separated and the organic layer dried. The solvents were thereafter distilled off and the remaining acid chloride was removed in vacuo. The yield was 195 gm. (95.3% of the theory) of the desired product.

*Analysis.*—Calculated Cl, 8.65%. Found: Cl, 8.50%.

Example 10

Using a procedure analogous to that described in Example 9, O,O - diethyl-O-(α-methyl-β-mercapto-p-chlorophenyl)-α-propionic acid ethyl ester-thionophosphate of the formula

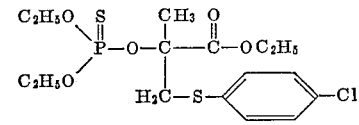

was prepared from O,O-diethyl-thiophosphoric acid chloride and α-hydroxy - α - methyl-β-(mercapto-p-chlorophenyl)-propionic acid ethyl ester.

*Analysis.*—Calculated: P, 7.27%. Found: P, 7.09%.

Example 11

Using a procedure analogous to that described in Example 1, O,O-diethyl-S-(α-methyl-β-phenyl-β-mercaptoethyl)-α-propionic acid methyl ester-dithiophosphate of the formula

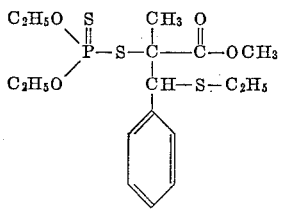

was prepared from the sodium salt of O,O-diethyl-dithiophosphoric acid and α-chloro-α-methyl-β-phenyl-β-mercaptoethyl-propionic acid ethyl ester.

*Analysis.*—Calculated: P, 7.35%. Found: P, 7.19%.

Example 12

Using a procedure analogous to that described in Example 1, O,O-diethyl-S-(α-methyl-β-mercaptomethyl)-α-propionic acid-n-propyl ester-dithiophosphate of the formula

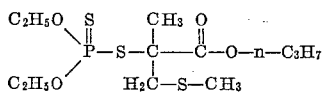

was prepared from the sodium salt of O,O-diethyl-dithiophosphoric acid and α - chloro-α-methyl-β-mercaptomethyl-propionic acid-n-propyl ester.

*Analysis.*—Calculated: P, 8.62%. Found: P, 8.50%.

Example 13

Using a procedure analogous to that described in Example 1, O,O - diisopropyl-S-(α-methyl-β-mercapto-n-propyl)-α-propionic acid methyl ester-dithiophosphate of the formula

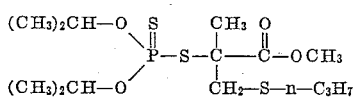

was prepared from the sodium salt of O,O-diisopropyl-dithiophosphoric acid and α - chloro-α-methyl-β-(mercapto-n-propyl)-propionic acid methyl ester.

*Analysis.*—Calculated: P, 7.95%. Found: P, 7.80%.

Example 14

Using a procedure analogous to that described in Example 1, O,O-diethyl-S-(α-methyl-β-methyl-β-mercaptoethyl)-α-propionic acid methyl ester-dithiophosphate of the formula

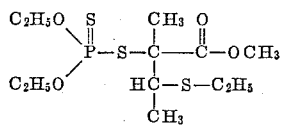

was prepared from the sodium salt of O,O-diethyl-dithiophosphoric acid and α-chloro-α-methyl-β-methyl-β-mercaptoethyl-propionic acid methyl ester.

*Analysis.*—Calculated: P, 8.60%. Found: P, 8.46%.

Example 14a

Using a procedure analogous to that described in Example 1, O,O-dimethyl-S-(α-methyl-β-mercaptoethyl)-α-propionic acid methyl ester-dithiophosphate of the formula

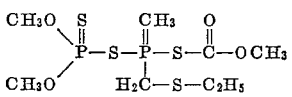

was prepared from the sodium salt O,O-dimethyl-dithiophosphoric acid and α-chloro-α-methyl-β-mercaptoethyl-propionic acid methyl ester.

*Analysis.*—Calculated: P, 9.75%. Found: P, 9.60%.

The novel phosphorus compounds according to the present invention, that is, those embraced by Formula I above, have useful pesticidal properties. More particularly, they exhibit very effective acaricidal and insecticidal activities at low concentrations, and are especially effective against the red spider mite.

For pesticidal purposes, the compounds according to the present invention are incorporated as active ingredients into inert liquid or solid carriers at predetermined concentrations to form suspensions, emulsions, solutions, dusting powders and similar compositions. These compositions are then applied by spraying or dusting to areas or plants infested with the animals to be eradicated. The preferred concentration of the compounds of the present invention is 0.01–3% by weight. The compositions may, of course, also comprise other pesticidally active ingredients.

The following examples illustrate various types of pesticidal compositions containing a compound of the present invention as an active ingredient.

Example 15

*Emulsion.*—40 gm. of O,O-dimethyl-S-(α-methyl-β-mercaptoethyl)-α-propionic acid methyl ester-dithiophosphate, 20 gm. of xylene and 40 gm. of naphthalene-sulfonate were emulsified in a sufficient amount of water to make the concentration of dithiophosphate in the aqueous emulsion about 0.0133%. The emulsion was then applied by spraying to bean plants infested with red spider mites; the following day the treatment was repeated. Two days after the second spraying, no living red spider mites could be observed on the treated bean plants; in other words, 100% of the mites had been killed.

Example 16

*Suspension.*—25 gm. of O,O-diethyl-S-(α-methyl-β-mercaptoethyl)-α-propionic acid methyl ester-dithiophosphate, 5 gm. of naphthalene sulfonate and 20 gm. of kaolin were admixed with each other and the mixture was thoroughly milled in a ball mill. The milled mixture was then suspended in a sufficient amount of water to make the concentration of dithiophosphate in the aqueous suspension 0.1%.

This suspension, when applied to bean plants infested with red spider mites in the manner described in the preceding example, also produced complete eradication of the mite population.

Example 17

*Dusting powder.*—2 gm. of O,O-diethyl-S-(α-methyl-β-mercapto-p-chlorophenyl)-α-propionic acid methyl ester-dithiophosphate and 98 gm. of kaolin were admixed and the mixture was milled into a homogeneous powder in a ball mill.

When bean plants infested with red spider mites were dusted with this powder, the mite population was completely eradicated within two days.

Although Examples 15–17 illustrate acaricidal compositions containing only three species of the group of compounds embraced by Formula I as active ingredients, it is obvious that any other member of the group may be substituted as active ingredient in these compositions. Moreover, the concentration of the active ingredient may be varied within the limits indicated above to meet particular requirements.

While the present invention has been illustrated with the aid of certain specific embodiments thereof, it will be readily apparent to others skilled in the art that the invention is not limited to these embodiments, and that various changes and modifications may be made without departing from the spirit of the invention or the scope of the appended claims.

We claim:
1. A compound of the formula

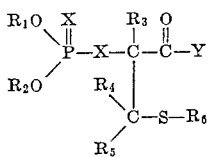

wherein
$R_1$, $R_2$ and $R_3$ are each selected from the group consisting of alkyl of 1 to 3 carbon atoms,
$R_4$ and $R_5$ are each selected from the group consisting of hydrogen, alkyl of 1 to 3 carbon atoms, phenyl and halophenyl,
$R_6$ is selected from the group consisting of alkyl of 1 to 3 carbon atoms, phenyl and substituted phenyl, the phenyl substituents being selected from the group consisting of lower alkyl, halogen and nitro,
X is selected from the group consisting of oxygen and sulfur, and
Y is selected from the group consisting of alkoxy of 1 to 6 carbon atoms and

where $R_8$ and $R_9$ are each selected from the group consisting of hydrogen, alkyl of 1 to 3 carbon atoms and, together with each other and the adjacent nitrogen atom, morpholino.

2. A compound of the formula

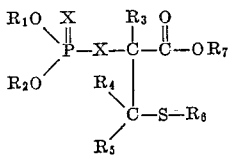

wherein
$R_1$, $R_2$ and $R_3$ are each selected from the group consisting of alkyl of 1 to 3 carbon atoms,
$R_4$ and $R_5$ are each selected from the group consisting of hydrogen, alkyl of 1 to 3 carbon atoms, phenyl and halophenyl,
$R_6$ is selected from the group consisting of alkyl of 1 to 3 carbon atoms, phenyl and halophenyl,
$R_7$ is alkyl of 1 to 6 carbon atoms, and
X is selected from the group consisting of oxygen and sulfur.

3. A compound of the formula

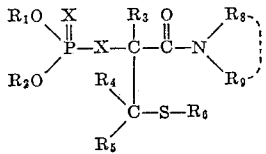

wherein
$R_1$, $R_2$ and $R_3$ are each selected from the group consisting of alkyl of 1 to 3 carbon atoms,
$R_4$ and $R_5$ are each selected from the group consisting of hydrogen, alkyl of 1 to 3 carbon atoms, phenyl and halophenyl,
$R_6$ is selected from the group consisting of alkyl of 1 to 3 carbon atoms, phenyl and halophenyl,
$R_8$ and $R_9$ are each selected from the group consisting of hydrogen, alkyl of 1 to 3 carbon atoms and, together with the adjacent nitrogen atom, morpholino, and
X is selected from the group consisting of oxygen and sulfur.

4. Methyl - α - (O,O - dimethyl - dithiophosphoryl)-α-(ethylmercaptomethyl)-propionate.
5. Methyl - α - (O,O - diethyl - dithiophosphoryl) - α-(ethylmercaptomethyl)-propionate.
6. Methyl - α - (O,O - diethyl-dithiophosphoryl) - α-(p-chlorophenylmercaptomethyl)-propionate.
7. α - (O,O - diethyl - dithiophosphoryl) - α - (p-chlorophenylmercaptomethyl)-propionic acid morpholide.
8. N - methyl - α - (O,O - diethyl - dithiophosphoryl)-α-(ethylmercaptomethyl)-propionamide.
9. α - (O,O - diethyl - dithiophosphoryl) - α - (ethylmercaptomethyl)-propionic acid morpholide.
10. N - methyl - α - (O,O - diethyl - dithiophosphoryl)-α-(p-chlorophenylmercaptomethyl)-propionamide.
11. Ethyl - α - (O,O - diethyl - phosphorylthio) - α-(p-chlorophenylmercaptomethyl)-propionate.
12. Ethyl - α - (O,O - diethyl - thiophosphoryl) - α-(p-chlorophenylmercaptomethyl)-propionate.
13. Ethyl - α - (O,O - diethyl - phosphoryl) - α - (p-chlorophenylmercaptomethyl)-propionate.
14. Methyl - α - (O,O - diethyl - dithiophosphoryl) - α-(α'-ethylmercaptobenzyl)-propionate.
15. n - Propyl - α - (O,O - diethyl - dithiophosphoryl)-α-(methylmercaptomethyl)-propionate.
16. Methyl - α - (O,O - diisopropyl - dithiophosphoryl)-α-(n-propylmercaptomethyl)-propionate.
17. Methyl - α - (O,O - diethyl - dithiophosphoryl)-α-[1-ethylmercaptoethyl-(1)]-propionate.
18. Ethyl - α - (O,O - diethyl - dithiophosphoryl) - α-(ethylmercaptomethyl)-propionate.

References Cited by the Examiner
UNITED STATES PATENTS

| | | | |
|---|---|---|---|
| 1,915,334 | 6/1933 | Salzberg et al | 260—243 |
| 2,075,359 | 3/1937 | Salzberg et al | 167—22 |
| 2,362,614 | 11/1944 | Calva | 167—22 |
| 2,815,312 | 12/1957 | Schuler | 260—941 |
| 3,076,009 | 1/1963 | Schrader et al. | 260—941 |
| 3,134,801 | 5/1964 | Sehring et al. | 260—941 |

ALEX MAZEL, *Primary Examiner.*

HENRY R. JILES, *Examiner.*

JOSE TOVAR, *Assistant Examiner.*